US007878720B2

United States Patent
Huang et al.

(10) Patent No.: US 7,878,720 B2
(45) Date of Patent: Feb. 1, 2011

(54) SHUTTER AND CAMERA MODULE HAVING SAME

(75) Inventors: Yi-Mou Huang, Tu-Cheng (TW); Kun-I Yuan, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 9 days.

(21) Appl. No.: 12/475,498

(22) Filed: May 30, 2009

(65) Prior Publication Data
US 2010/0074611 A1    Mar. 25, 2010

(30) Foreign Application Priority Data
Sep. 25, 2008    (CN) .................. 2008 1 0304670

(51) Int. Cl.
*G03B 9/08* (2006.01)
(52) U.S. Cl. ....................................... 396/452

(58) Field of Classification Search ............... 396/463, 396/452
See application file for complete search history.

(56) References Cited

U.S. PATENT DOCUMENTS

| | | | | |
|---|---|---|---|---|
| 5,029,989 A | * | 7/1991 | Phillips | 359/276 |
| 6,001,465 A | * | 12/1999 | Takahashi et al. | 428/220 |
| 6,377,409 B2 | * | 4/2002 | Kanai | 359/834 |
| 6,818,287 B1 | * | 11/2004 | Ogawa et al. | 428/292.1 |
| 2005/0122417 A1 | * | 6/2005 | Suzuki | 348/340 |
| 2007/0236803 A1 | * | 10/2007 | Ohishi et al. | 359/666 |
| 2008/0101791 A1 | * | 5/2008 | Hsiao | 396/457 |

* cited by examiner

Primary Examiner—W.B. Perkey
Assistant Examiner—Fang-Chi Chang
(74) Attorney, Agent, or Firm—Raymond J. Chew

(57) ABSTRACT

A shutter for a micro camera module includes a substrate made from silicon wafer and a light absorbing layer covering the surface.

16 Claims, 6 Drawing Sheets

SHUTTER AND CAMERA MODULE HAVING SAME

BACKGROUND

1. Technical Field

The present disclosure relates to camera modules, in particular, to a shutter used in a micro camera module, and to a camera module having the shutter.

2. Discussion of Related Art

Currently, with rapid development of multimedia technology, micro camera modules are widely applied in various electric products, such as mobile phones. The micro camera modules are becoming small in size, and versatile in functions.

A camera module generally includes a lens, a shutter, a focusing motor, and a shutter motor. To meet miniaturization requirement of micro camera modules, micro shutters (i.e., silicon shutter made from silicon wafer) are highly desired. However, silicon wafer has a very smooth surface, which may reflect light irradiated thereon, and cause bright spots in the photos.

Therefore, there is a desire to develop a shutter that is capable of overcoming above problem.

BRIEF DESCRIPTION OF THE DRAWINGS

Many aspects of the present shutter, and camera module can be better understood with reference to the following drawings. The components in the drawings are not necessarily drawn to scale, the emphasis instead being placed upon clearly illustrating the principles of the present moveable assembly, micro actuator and camera module. In the drawings, all the views are schematic.

DETAILED DESCRIPTION OF EXEMPLARY EMBODIMENTS

Figure 1:
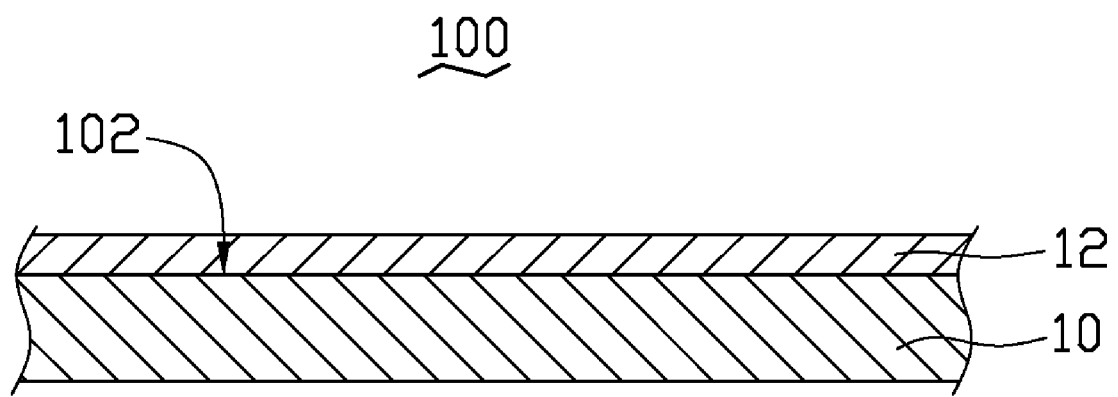
FIG. 1 is a cross sectional view of a shutter according to a first embodiment.

Referring to FIG. 1, a shutter 100 provided in a first embodiment includes a substrate 10 and a light absorbing layer 12 formed on a surface of the substrate 10.

The substrate 10 is comprised of a polished silicon wafer, and the shape of the substrate 10 is in coincidence with practical requirement of a camera module. To reduce space occupied by the shutter 100, the substrate 10 can be round shape. The substrate 10 has a plane surface 102.

The light absorbing layer 12 is formed on the plane surface 102. The light absorbing layer 12 can absorb light beams irradiated thereon thereby reducing light reflection on surface of the shutter to prevent bright spots from occurring in photos captured using a camera module. In the first embodiment, the light absorbing layer 12 is comprised of a single layer anti-reflection film such as a coating of silicon dioxide, titanium dioxide, silicon nitride, chromium oxide, niobium oxide, zirconium oxide, yttrium oxide, or aluminum oxide. Alternatively, the light absorbing layer 12 can be comprised of a multilayer anti-reflection film including a number of coating layers. The refractive indexes of the coating layers increase from a side of the multilayer anti-reflection film to an opposite side of the multilayer anti-reflection film. The anti-reflection film can be formed using a vacuum depositing process such as evaporating, or sputtering. The thickness of the anti-reflection film can be ¼ of wavelength of incident light. For sunlight, which has a broad spectrum range, the thickness of the anti-reflection film can be ¼ of average wavelength. A reflection ratio of the anti-reflection film is less than 10%.

Figure 2:
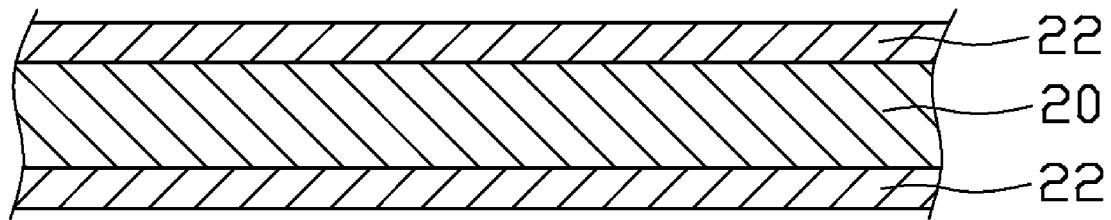
FIG. 2 is a cross sectional view of a shutter according to a second embodiment.

As shown in FIG. 2, the shutter 200 provided in a second embodiment is similar to the shutter 100, except that, among other things, two light absorbing layers 22 are formed on two opposite surfaces of the substrate 20, respectively. The light absorbing layers 22 are similar to the light absorbing layer 12.

Figure 3:
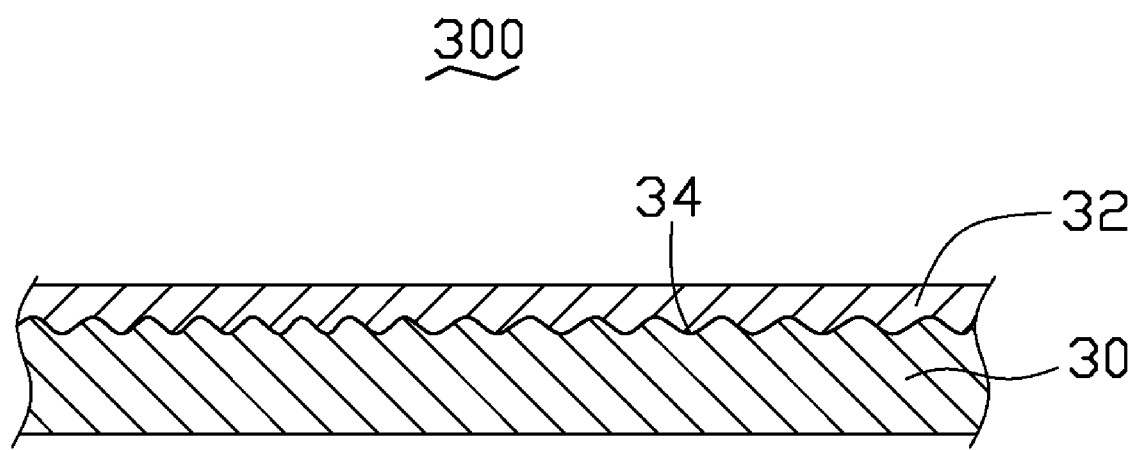
FIG. 3 is a cross sectional view of a shutter according to a third embodiment.

Referring to FIG. 3, the shutter 300 provided in a third embodiment is similar to the shutter 100, except that, among other things, a light scattering structure is formed on the surface of the substrate 30 that is in contact the light absorbing layer 32. In the third embodiment, the light scattering structure is comprised of a number of grooves 34 distributed across the surface of the substrate 30. The grooves 34 may cross each other or parallel to each other. The grooves 34 can be formed using laser or reactive ion etching. The light scattering structure can further scatter light irradiated onto the light absorbing layer 32. It is understood that the scattering structure is not limited as shown in FIG. 3. For example, protrusions, dots distributed on the surface of the substrate 30 have similar effect to the grooves 34.

Figure 4:
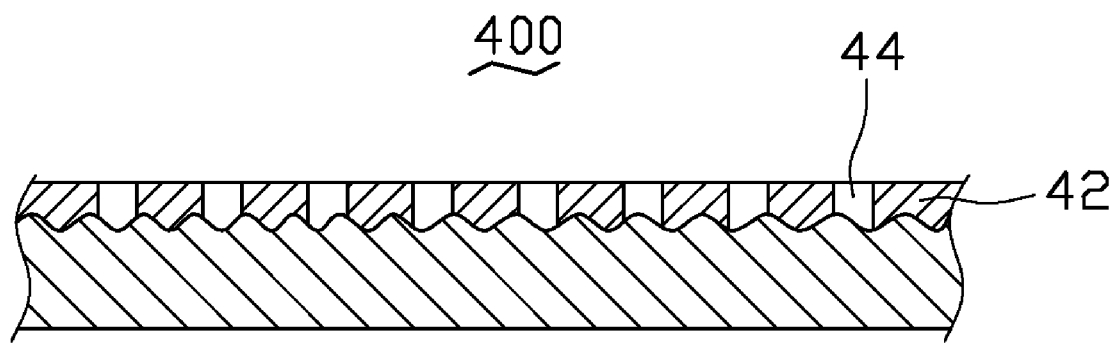
FIG. 4 is a cross sectional view of a shutter according to a fourth embodiment.

Referring to FIG. 4, the shutter 400 provided in a fourth embodiment is similar to the shutter 300, except that, among other things, a number of through holes 44 are defined in the light absorbing layer 42. The diameter of the through holes 44 can be equal to the thickness of the light absorbing layer 42. The through holes 44 are uniformly distributed in the light absorbing layer 42. The through holes 44 can further improve light scattering in the light absorbing layer 42. Alternatively, the through holes 44 can be replaced with grooves extending along surface of the light absorbing layer 42. The through holes 44 can be filled with material having different refractive index with the light absorbing layer 42.

Figure 5:
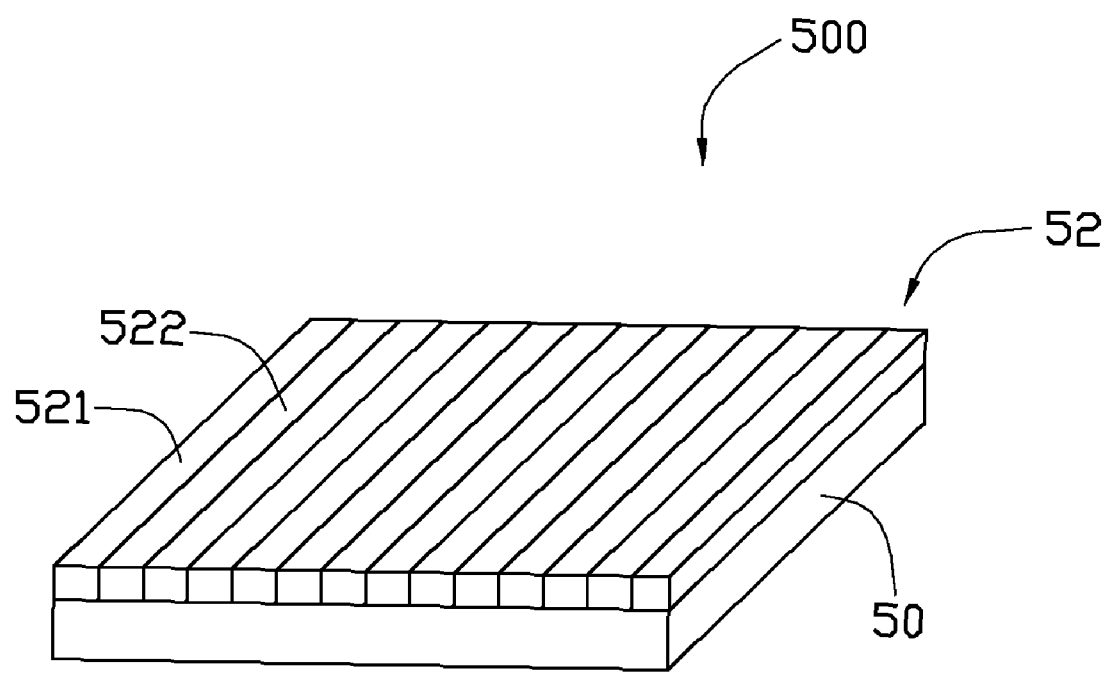
FIG. 5 is a cross sectional view of a shutter according to a fifth embodiment.

Referring to FIG. 5, the shutter 500 provided in a fifth embodiment is similar to the shutter 100, except that, among other things, the light absorbing layer 52 includes a number of first light absorbing bars 521 and second light absorbing bars 522. The first light absorbing bars 521 and the second light absorbing bars 522 are alternately arranged, and have different refractive indexes. The first light absorbing bars 521 and the first light absorbing bars 522 can be separately formed. For example, a mask can be employed to cover the surface of the substrate 50 corresponding to the second light absorbing bars 522 but exposing the surface substrate 50 corresponding to the first light absorbing bars 521, and the first light absorbing bars 521 can be deposited using a vacuum depositing process. After the first light absorbing bars 521 are formed, another mask is used to protect the first light absorbing bars 521, and the second light absorbing bars 522 are deposited. In the fifth embodiment, because the different refractive indexes, the light in the light absorbing layer 52 are refracted, reflected between the first and second light absorbing bars 521, 522.

Figure 6:
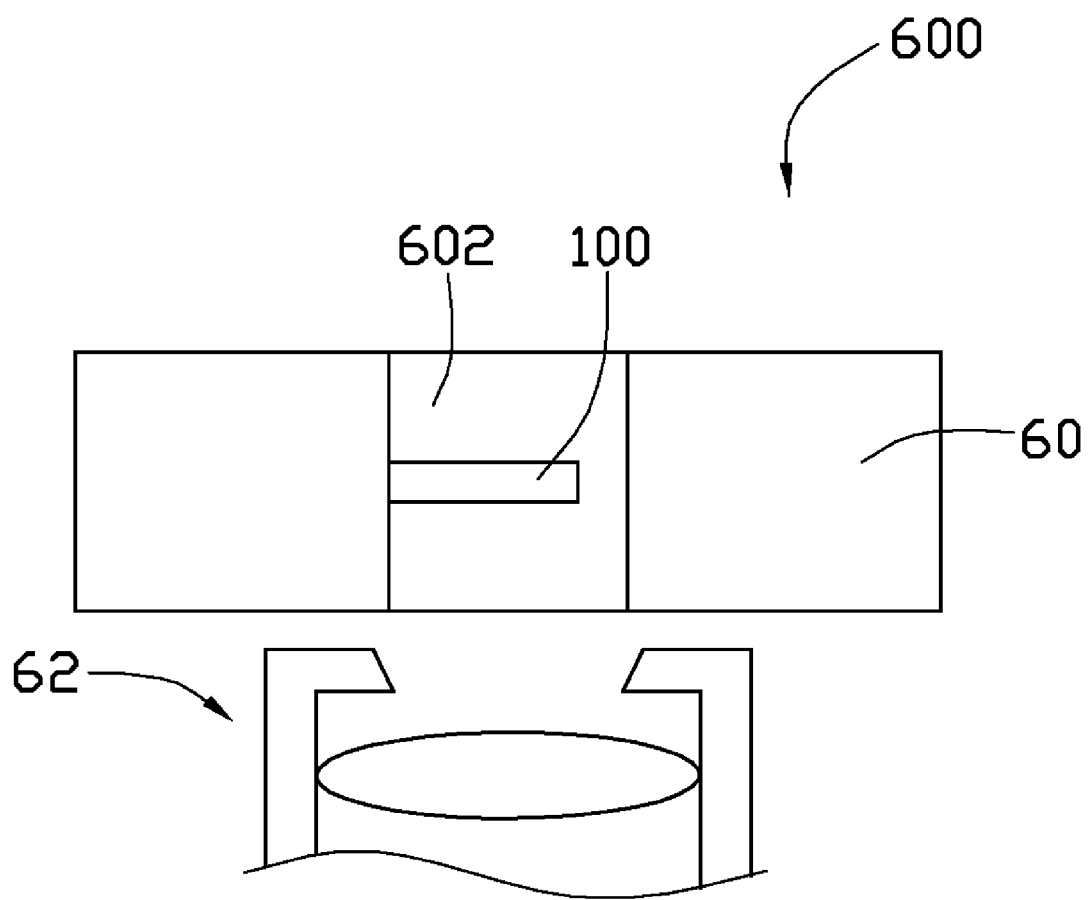
FIG. 6 is a schematic view of a camera module according to a sixth embodiment.

Referring to FIG. 6, a camera module 600 provided in a sixth embodiment includes the shutter 100, a driver 60, and a lens module 62. The driver 60 defines a through hole 602 therein. The shutter 100 is received in the through hole 602, and is connected to the driver 60. The diver 60 can drive the shutter 100 to move, thereby blocking light in the through hole 602 or allowing light to pass through the through hole 602.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A shutter, comprising:
   a substrate having a surface, and
   a light absorbing layer covering the surface, wherein a plurality of through holes is defined in the light absorbing layer, and the through holes are filled with a material that has a refractive index different from that of the light absorbing layer.

2. The shutter as claimed in claim 1, wherein the substrate is comprised of silicon wafer.

3. The shutter as claimed in claim 1, wherein the light absorbing layer is comprised of an anti-reflection film having a reflection ratio less than 10%.

4. The shutter as claimed in claim 3, wherein the anti-reflection film is comprised of material selected from the group consisting of silicon dioxide, titanium dioxide, silicon nitride, chromium oxide, niobium oxide, zirconium oxide, yttrium oxide, and aluminum oxide.

5. The shutter as claimed in claim 3, wherein a light scattering structure is formed on the surface.

6. The shutter as claimed in claim 5, wherein the light scattering structure comprises a plurality of grooves or protrusions.

7. A camera module, comprising:
   a lens group;
   a shutter; and
   a driver defining a through hole, the lens group facing the through hole, the shutter received in the through hole and connected to the driver, the shutter comprising:
   a substrate defining a surface, and
   a light absorbing layer covering the surface, wherein a plurality of through holes is defined in the light absorbing layer, and the through holes are filled with a material that has a refractive index different from that of the light absorbing layer.

8. The shutter as claimed in claim 7, wherein the substrate is comprised of silicon wafer.

9. The shutter as claimed in claim 7, wherein the light absorbing layer is comprised of an anti-reflection film.

10. The shutter as claimed in claim 9, wherein the anti-reflection film is comprised of material selected from the group consisting of silicon dioxide, titanium dioxide, silicon nitride, chromium oxide, niobium oxide, zirconium oxide, yttrium oxide, and aluminum oxide.

11. The shutter as claimed in claim 9, wherein a light scattering structure is formed on the surface.

12. The shutter as claimed in claim 11, wherein the light scattering structure comprises a plurality of grooves or protrusions.

13. A shutter, comprising:
    a substrate having a surface, and
    a light absorbing layer covering the surface, wherein the light absorbing layer is comprised of a plurality of first light absorbing bars and second light absorbing bars, the first light absorbing bars and second light absorbing bars being alternately arranged, and having different refractive indexes.

14. The shutter as claimed in claim 13, wherein the substrate is comprised of a silicon wafer.

15. The shutter as claimed in claim 13, wherein the light absorbing layer is comprised of an anti-reflection film having a reflection ratio less than 10%.

16. The shutter as claimed in claim 15, wherein the anti-reflection film is comprised of a material selected from the group consisting of silicon dioxide, titanium dioxide, silicon nitride, chromium oxide, niobium oxide, zirconium oxide, yttrium oxide, and aluminum oxide.

* * * * *